(12) United States Patent
Chundi et al.

(10) Patent No.: US 12,135,833 B2
(45) Date of Patent: *Nov. 5, 2024

(54) SYSTEMS AND METHODS FOR GUIDING PERSPECTIVES FOR MULTI-PERSPECTIVE CONTENT

(71) Applicant: Adeia Guides, Inc., San Jose, CA (US)

(72) Inventors: Charishma Chundi, Andhra Pradesh (IN); Rajendra Pandey, Karnataka (IN); Susanto Sen, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,354

(22) Filed: Jul. 7, 2023

(65) Prior Publication Data
US 2023/0418366 A1    Dec. 28, 2023

Related U.S. Application Data (63) Continuation of application No. 17/696,122, filed on Mar. 16, 2022, now Pat. No. 11,733,770, which is a continuation of application No. 16/841,461, filed on Apr. 6, 2020, now Pat. No. 11,307,648.

(51) Int. Cl.
| | |
|---|---|
| *G06F 3/01* | (2006.01) |
| *G06F 3/16* | (2006.01) |
| *G06T 15/20* | (2011.01) |

(52) U.S. Cl.
CPC ............. *G06F 3/011* (2013.01); *G06F 3/016* (2013.01); *G06T 15/20* (2013.01); *G06F 3/167* (2013.01)

(58) Field of Classification Search
CPC .......... G06F 3/011; G06F 3/016; G06F 3/167; G06F 3/012; G06T 15/20; A63F 13/211; A63F 13/212; A63F 13/25; A63F 13/35; A63F 13/428; A63F 13/5255; H04N 21/21805; H04N 21/25891; H04N 21/44222; H04N 21/8133
See application file for complete search history.

(56) References Cited

U.S. PATENT DOCUMENTS

| | | | |
|---|---|---|---|
| 9,215,423 | B2 | 12/2015 | Kimble et al. |
| 9,756,349 | B2 | 9/2017 | Perlman et al. |
| 10,313,755 | B2 | 6/2019 | Kimble et al. |

(Continued)

*Primary Examiner* — Vijay Shankar
(74) *Attorney, Agent, or Firm* — Haley Guiliano LLP (57) ABSTRACT

A method of guiding perspectives in a multi-perspective content delivery system. The method includes receiving profile data associated with an end-user multi-perspective content consumption device and identifying a preference for content based upon the profile data. Multi-perspective content is transmitted to a device associated with the first profile data, the multi-perspective content representing a first perspective of a plurality of time-coincident VR perspectives. The VR system determines whether the first perspective correlates with the preference for content by at least a predetermined amount. In response to determining that the first perspective does not correlate with the preference for content by at least the predetermined amount, determining a second perspective of the plurality of perspectives that correlates to a greater degree with the preference for content than the first perspective, and transmitting from the end-user device a cue for recommending a change in perspective to the second perspective.

20 Claims, 8 Drawing Sheets

(56) References Cited

U.S. PATENT DOCUMENTS

| | | |
|---|---|---|
| 10,581,943 B2 | 3/2020 | Furtwangler |
| 10,972,522 B2 | 4/2021 | Furtwangler |
| 11,012,749 B2 | 5/2021 | Kimble et al. |
| 11,307,648 B2 | 4/2022 | Chundi et al. |
| 11,307,649 B2 | 4/2022 | Chundi et al. |
| 11,733,770 B2 | 8/2023 | Chundi et al. |
| 11,792,286 B2 * | 10/2023 | Aher ................... H04L 67/55 709/224 |
| 11,838,256 B2 * | 12/2023 | Aher ................... H04L 51/226 |
| 2014/0058812 A1 | 2/2014 | Bender et al. |
| 2021/0311543 A1 | 10/2021 | Chundi et al. |
| 2021/0311544 A1 | 10/2021 | Chundi et al. |
| 2021/0357788 A1 | 11/2021 | Vanlandeghem et al. |
| 2021/0357956 A1 | 11/2021 | Shao et al. |
| 2021/0357958 A1 | 11/2021 | Shao et al. |
| 2021/0357973 A1 | 11/2021 | Vanlandeghem et al. |
| 2022/0382363 A1 | 12/2022 | Chundi et al. |
| 2023/0052274 A1 | 2/2023 | Shah et al. |

* cited by examiner

SYSTEMS AND METHODS FOR GUIDING PERSPECTIVES FOR MULTI-PERSPECTIVE CONTENT

CROSS-REFERENCE TO RELATED APPLICATIONS

This application is a continuation of U.S. patent application Ser. No. 17/696,122, filed Mar. 16, 2022, which is a continuation of U.S. patent application Ser. No. 16/841,461, now U.S. Pat. No. 11,307,648, filed Apr. 6, 2020. This application is also related to U.S. patent application Ser. No. 16/841,463, now U.S. Pat. No. 11,307,649, filed Apr. 6, 2020. The disclosures of which are hereby incorporated by reference herein in their entireties.

BACKGROUND

The present disclosure relates to virtual and augmented reality and, in particular, to systems and related processes for guiding perspectives in a multi-perspective virtual or augmented reality content delivery environment.

SUMMARY

Multi-perspective content delivery (e.g., virtual reality (VR) systems) can allow multiple devices to receive virtual and/or augmented reality content concurrently with multiple content perspectives. Some multi-perspective systems provide a panoramic viewing environment, including, for example, a 360-degree or "spherical" viewing environment in which content (e.g., a VR "world") may include multiple concurrent perspectives, presented via different aspects of a virtual or augmented multi-perspective environment, with different features, characters, themes, and other characteristics. In some embodiments, the environment includes a continuum of perspectives that change to a greater extent than 360 degrees in one or more directions of rotation. In many circumstances, different users of the devices have differing preferences for content and/or may find certain content objectionable. In some systems, there may not be a readily available or efficient way to selectively redirect attention away from objectionable content or change a perspective to a more preferred or less objectionable perspective.

In some cases, while a device is presenting multi-perspective content, the currently presented perspective may not be the perspective most pertinent to the multi-perspective domain or group of users experiencing the content. For example, VR content may be directed to certain perspectives at different times, such as the perspective most pertinent or central to a content theme or storyline. Multi-perspective content, for instance, having a story or theme involving a central character, may at times include perspectives involving an important activity of the character. The device at such times may not present the pertinent or central perspective(s), and thus the important activity may not be consumed through the device at these times.

An approach utilizes user profile data to determine particular preferences associated with a user account. A multi-perspective system operates with multiple devices connected to the system, including a device associated with a user account in which the preferences associated with the account were determined. While the associated device presents a particular perspective of multiple available concurrent perspectives, the system determines whether the presented perspective correlates with the determined preferences by at least a predetermined amount (e.g., a particular threshold level of preferred content). If the presented perspective does not correlate by at least the predetermined amount, the system determines if another available perspective correlates with the determined preferences by a greater amount than the presented perspective.

If a different perspective correlates with the determined preferences to a greater degree, the system generates a cue that is transmitted to the device providing guidance for selecting the more highly correlated perspective. The cue may be a signal separate from or embedded in the delivered content including, for example, visual, audio, or haptic signals directing a consumer of the content to the different perspective. The signals may include arrows pointing a viewer to the different perspective, stereo sounds directed to the side of a listener that corresponds to the different perspective, or haptic signals delivered through devices adapted for delivering corresponding directional forces to a user (e.g., through a glove, suit).

In some embodiments, the preferences for content may include particular genres of content including, for example, action, violence, romance, comedy, mystery, science fiction, and/or drama. Preferences or attributes of content may further include characteristics such as violence, particular characters or types of characters, types of scenes, backgrounds, graphic scenes, etc. Data used for determining preferences for a user account may include, for example, associated consumption history of multi-perspective content (e.g., AR/VR content), streaming content, internet browsing, and/or social media.

A perspective presented on a device may include, for example, a fight scene, while an analysis of an associated account profile indicates a profile with a significant aversion to violence. When the system compares the present perspective of the fight scene with the profile preferences having an aversion to such content, a determination is made to compare the preferences with characteristics of alternate perspectives. In an embodiment, an alternative concurrent perspective that most closely correlates with the profile preferences is selected for being cued to the device. For example, a concurrent alternative perspective may correlate more with comedic content consistent with an identified preference of the profile. The system may then transmit a cue through the device indicating/guiding the user of the device to switch to the more highly correlated perspective.

In some embodiments, a multi-perspective content system provides multi-perspective content which, at times, includes a prioritized perspective or center-point perspective among the multiple perspectives. The center point perspective may include content that is more significant in comparison to content of other perspectives. For example, the center point perspective may exclusively provide content important to its consumption including particular character interaction, storyline information, actions of other users/characters, and/or key elements of a VR/AR game.

In an approach, a multi-perspective system is configured to receive an indication that a particular perspective is a prioritized/center-point perspective and, in response to receiving the indication, determine whether the currently presented perspective from a device is not the center point perspective. In response to determining that the currently presented/consumed perspective is not the center-point perspective, the system transmits a cue directing/guiding a consumer of the multi-perspective content to switch to the center-point perspective. Such as described herein, the cue can be delivered independently of the content and/or with the content in the form of a visual, audio, and/or haptic signal directing a consumer to the center-point perspective.

The multi-perspective system may further deliver cues to a device that guide a consumer to perspectives that correlate with a profile associated with the consumer. The multi-perspective system receives profile data associated with a consumer account and identifies preferences for content based upon the data. In an embodiment, if there is no center-point perspective that supersedes perspectives of current multiple perspectives, the system determines if the active/selected perspective correlates at least a predetermined amount with the profile data. If the active perspective does not correlate at least to the predetermined amount, the system determines if one of the multiple perspectives correlates to a greater degree with the profile than the active perspective. If a one of the other perspectives so correlates, a cue is transmitted by the system to the device for guiding the user to the other greater-correlating perspective.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In an aspect, techniques are described for guiding the presentation of preferred or prioritized perspectives in multi-perspective content systems providing multiple concurrent perspectives. In some embodiments, an AR/VR system generates cues with content in order to direct attention to a preferred or prioritized perspective.

Figure 1:
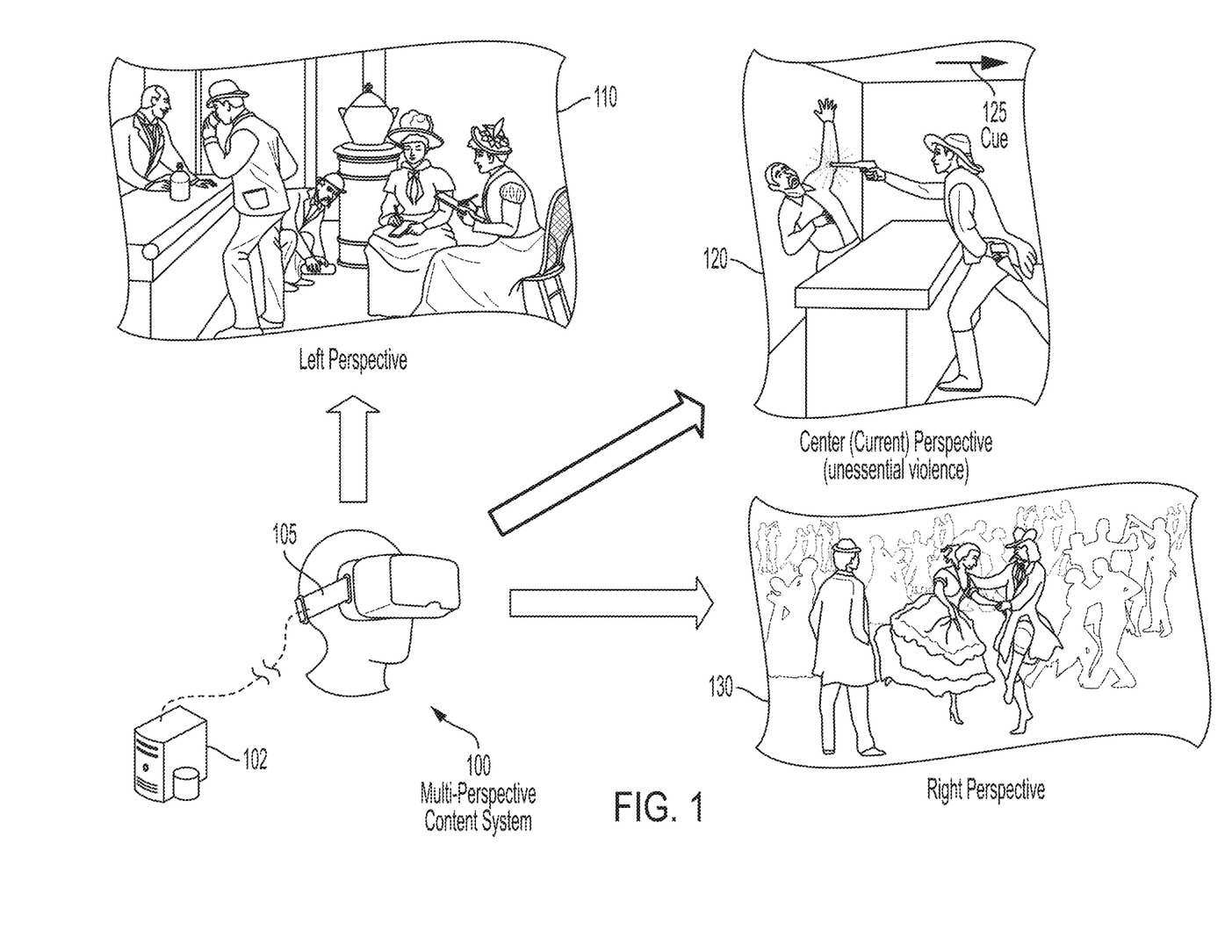
FIG. 1 is a block diagram of a multi-perspective content system guiding attention to a perspective, according to some embodiments of the disclosure.

FIG. 1 is a block diagram of a multi-perspective content system 100 guiding attention to a perspective, according to some embodiments of the disclosure. Multi-perspective content system 100 generates at least three concurrent perspectives 110, 120, and 130 of content for presentation in a multi-perspective realm. The perspectives 110, 120, and 130 may be defined as relative to a reference, such as a center point or center line of a multi-perspective content device 105. Multi-perspective content system 100 may include one or more servers 102 that may provide and/or direct all or a portion of concurrent perspectives to multi-perspective content devices such as through a computer network. In the example of FIG. 1, multi-perspective content device 105 initially presents perspective 120. Perspective 110 represents a virtual view to the left of perspective 120 while perspective 130 represents a virtual view to the right of perspective 120. In an embodiment, a user profile linked to device 105 is accessed by multi-perspective content system 100 in which the user profile reflects preferences and/or aversions to particular characteristics of multi-perspective content. The user profile may include analysis of prior multi-perspective content consumption data, streaming content, internet browsing, and/or social media, for example.

Based upon the user profile, the multi-perspective content system 100 determines whether the currently presented perspective 120 correlates or matches by at least a predetermined amount with characteristics of the currently presented perspective. Such a matching determination may be made based upon correspondence and/or aversion with genres and/or types of content including, for example, those with characteristics of violence, obscenity, comedy, action, certain types of characters, background scenery, and other content features. In the present embodiment, multi-perspective content system 100 has determined that the profile preference associated with device 105 does not match sufficiently with characteristics of the violence exhibited in perspective 120.

In response to determining that the profile preference and characteristics of the currently presented perspective do not match by at least the predetermined amount, the multi-perspective content system 100 further determines if another concurrent perspective matches with the profile preference to a greater level than the currently presented preference does. If the multi-perspective content system 100 identifies a better-matching perspective, the multi-perspective content system 100 may cause the presentation of a cue from the device for directing attention to the better-matching perspective.

In the example of FIG. 1, in response to determining that the currently presented perspective 120 does not match with the profile preference sufficiently, multi-perspective content system 100 further determines that the profile preference matches to a greater amount with perspective 130 than either perspective 110 or perspective 120 does. In the present embodiment, multi-perspective content system 100 determines that the profile preference better matches with the characteristics of comedy and pleasantness of perspective 130.

Based upon the determination that the profile better matches with perspective 130, multi-perspective content system 100 causes generation of a visual cue 125 (a right-pointing arrow) designed to direct attention to perspective 130 to the right of currently active perspective 120. Additional or different cues may also be used, including, for example, sounds or haptic feedback configured to emanate from device 105 to a user's right side. Based upon receiving cue 125, device 105 may be used to change perspectives from perspective 120 to perspective 130. In some embodiments, perspectives are changed by a user repositioning their head or gaze in a direction that corresponds to the direction indicated by the cue 125.

Figure 2:
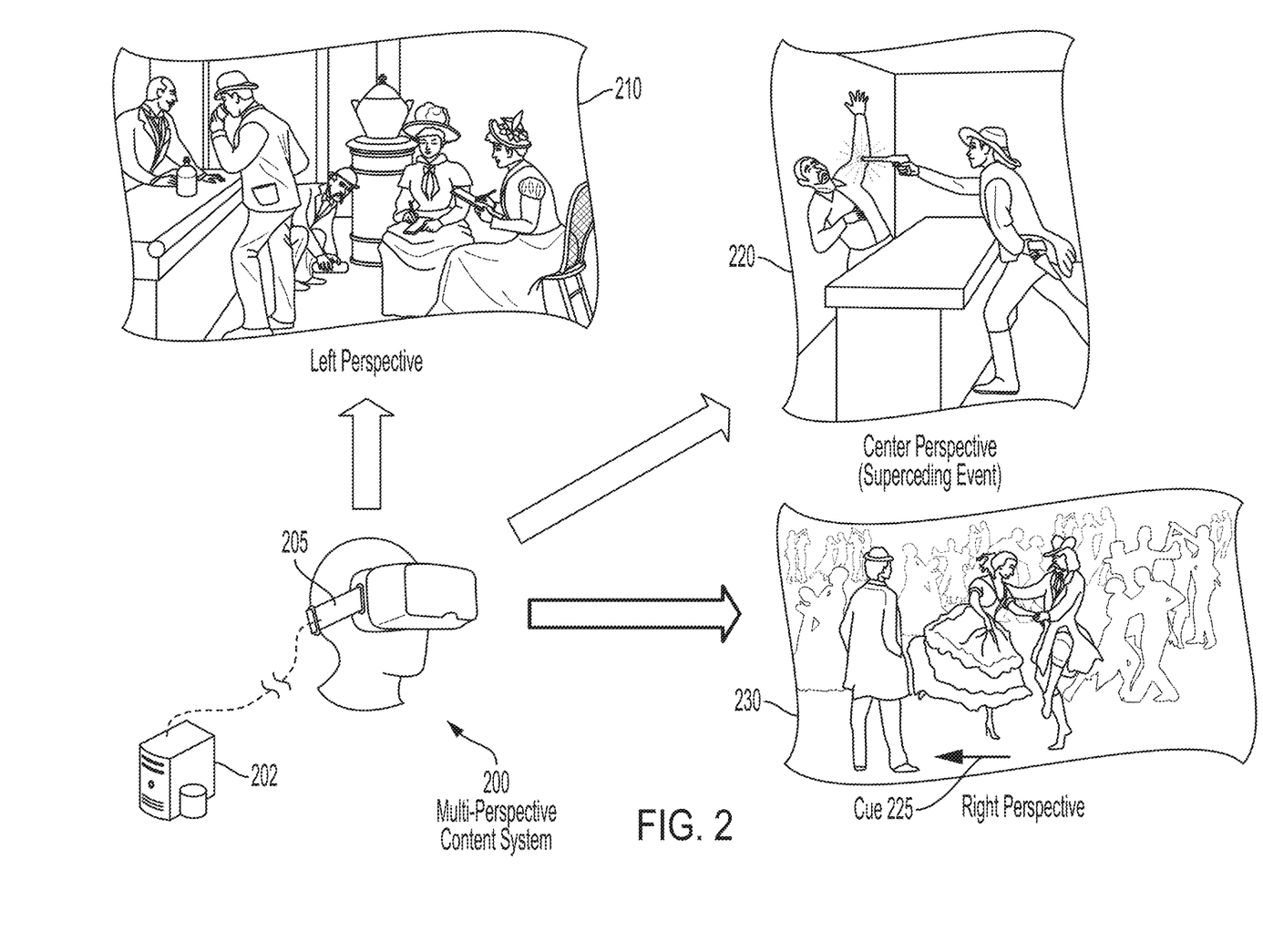
FIG. 2 is a block diagram of a multi-perspective content system guiding attention to a perspective, according to some embodiments of the disclosure.

FIG. 2 is a block diagram of a multi-perspective content system 200 guiding attention to a perspective according to some embodiments of the disclosure. Multi-perspective content system 200 generates at least three concurrent perspectives 210, 220, and 230 of content for presentation in a multi-perspective content realm. The perspectives 210, 220, and 230 may be defined as relative to a reference, such as a center point or center line of multi-perspective content device 205. Multi-perspective content system 200 may include one or more servers 202 that provide and/or direct all or a portion of concurrent perspectives to VR devices such as through a computer network. In the example of FIG. 2, multi-perspective content device 205 initially presents perspective 230. Perspective 220 represents a virtual view to the left of perspective 230 while perspective 210 represents a virtual view to the left of perspective 220.

At a point in time, multi-perspective content system 200 determines that content included in perspective 220 is prioritized content with respect to each of the perspectives 210, 220, and 230. Perspective 220 may be classified as a "center point perspective," such as based upon an event involving a character central to a storyline of the content. Classification as a center point perspective triggers the multi-perspective content system 200 to cause a visual cue 225 (a left-pointing arrow) to be generated and presented through device 205 within the presentation of the current (non-center point) perspective 230. The cue 225 is designed to direct attention to perspective 220 and may additionally be generated with, for example, audio or haptic cues.

Based upon receiving cue 225, device 205 may be used to change perspectives from perspective 230 to perspective 220. In some embodiments, perspectives may be changed by a user repositioning their head or gaze in a direction that corresponds to the direction indicated by the cue 225.

In some embodiments, a user profile linked to device 205 is accessed by multi-perspective content system 200, in which the user profile reflects preferences and/or aversions to particular characteristics of multi-perspective content. When a currently presented perspective is no longer determined to be a center-point perspective, or when a perspective currently not being viewed is determined to have content with a higher viewing priority or preference than that of the currently presented perspective, multi-perspective content system 200 may determine that the currently presented perspective does not match to at least a predetermined amount with the profile. Such as described above with respect to FIG. 1 and multi-perspective content system 100, multi-perspective content system 200 may then determine that an alternative perspective matches to a greater degree with the profile than the currently presented perspective. Multi-perspective content system 200 may then cause a cue to be generated in order to direct attention to the alternative perspective.

Figure 3:
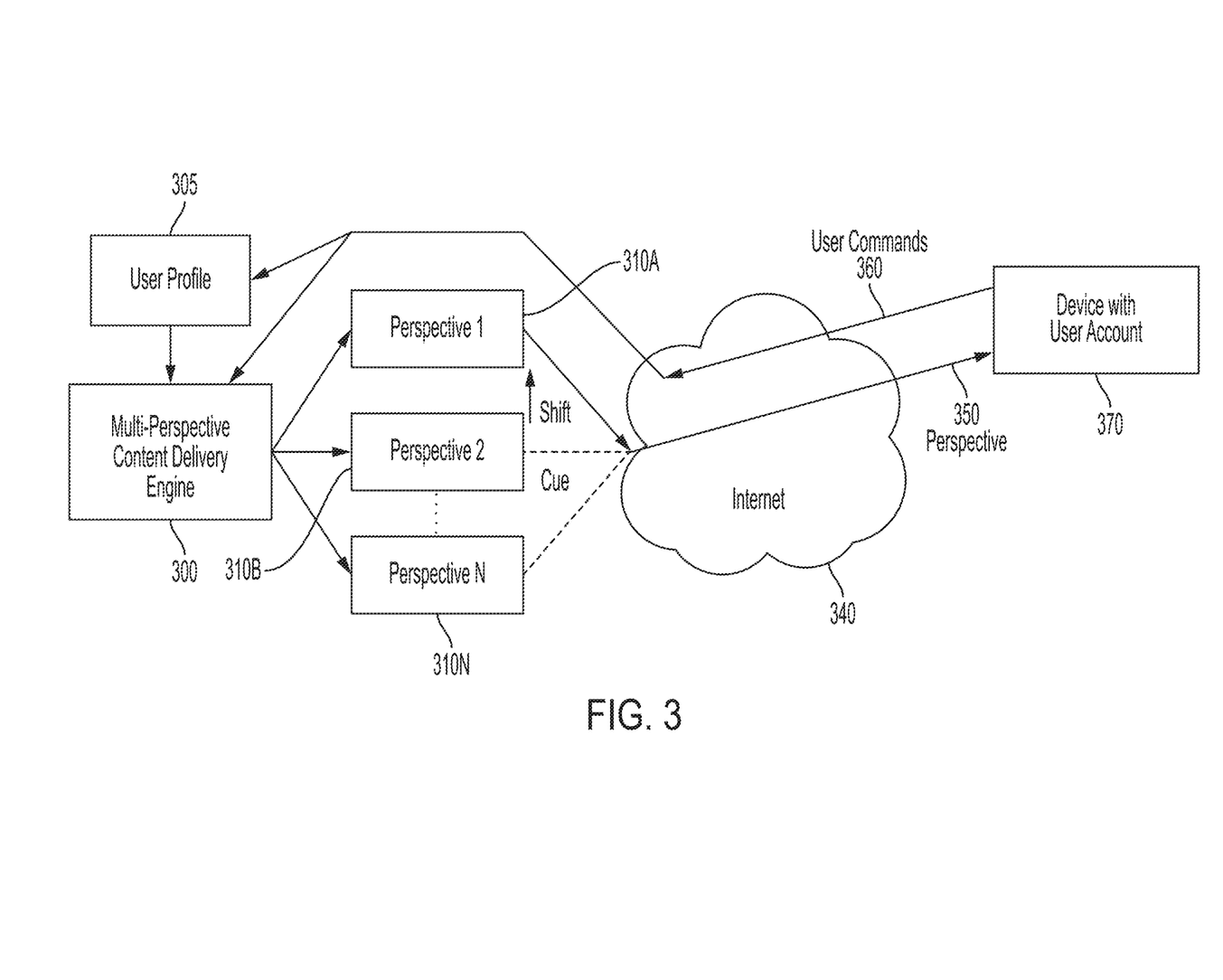
FIG. 3 shows an illustrative block diagram of a system for guiding attention to an AR/VR perspective, according to some embodiments of the disclosure.

FIG. 3 shows an illustrative block diagram of a system for guiding attention to a perspective according to some embodiments of the disclosure. An AR/YR engine 300 generates content perspectives 310A, 310B, . . . 310N such as for providing a 360-degree viewing environment. The perspectives 310A, 310B, . . . 310N are at least partially transmitted and controlled through a network transmission 350 across internet 340 to a multi-perspective content device 370. Multi-perspective commands (e.g., commands to switch perspectives) are received by the multi-perspective content engine from multi-perspective device 370 through a network transmission 360 across internet 340. Multi-perspective device 370 is associated with a particular user account, for which a user profile 305 is established.

Multi-perspective engine 300 analyzes the user profile 305 and, based upon the analysis, determines a profile preference for multi-perspective content. The user profile 305 may include historical data relating to multi-perspective content consumption, streaming content, internet browsing, and/or social media, for example. Analysis may include analyzing metadata associated with the consumed content that identifies the characteristics of the consumed content. For example, metadata relating to movies, games, or other content including multi-perspective content, is typically available which identifies features including characteristics of violence, comedy, and romance, etc. A pattern may be established based upon the analysis that may be predictive of preference associated with the profile. In some embodiments, a machine learning system is employed that is trained to correlate patterns of content consumption with particular preferences.

Based upon a determined preference of the user profile 305 associated with device 370, the multi-perspective content engine determines if the currently presented perspective 310B correlates/matches to at least a predetermined amount with the profile preference. For example, a user profile 305 may indicate a strong preference for comedy/romance (e.g., 70%) and an aversion to violence (e.g., 10% preference). Similarly, different perspectives may be similarly attributed with particular levels of comedy/romance and violence. In some embodiments, if the profile 305 does not match with the current perspective at least to a predetermined amount (e.g., within 10%), the multi-perspective content engine will classify the current perspective as non-matching.

When the multi-perspective content engine determines that the current perspective is non-matching, the AR/YR engine further determines whether one or more of the other perspectives of 310A, . . . , 310N better matches with profile 305. In some embodiments, multi-perspective content engine determines the perspective which most matches with profile 305. Based upon determining a better-matching perspective (e.g., perspective 310A), the multi-perspective content engine causes a cue to be generated and presented by device 370 for directing the attention of a user of device 370 to perspective 310A. Cues may be visual, audio, and/or haptic and may be integrated with the presentation of perspectives such as further described herein. After a cue is presented by device 370, device 370 may receive a command to switch to the perspective 310A (the better-matching perspective), after which the perspective presented by device 370 is changed to perspective 310A.

Figure 4:
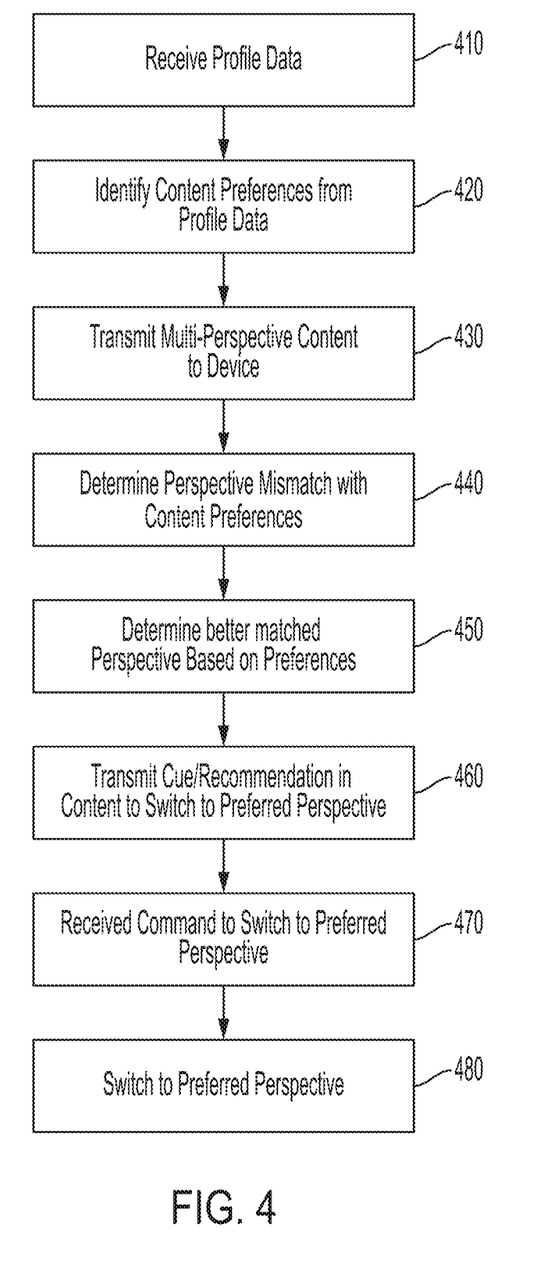
FIG. 4 shows an illustrative flowchart of a process for directing attention to preference-based perspectives in a VR system, according to some embodiments of the disclosure.

FIG. 4 shows an illustrative flowchart of a process for directing attention to preference-based perspectives in a multi-perspective content system, according to some embodiments of the disclosure. At block 410, data is received by a multi-perspective content system pertaining to a particular user profile including, for example, historical data of consumption associated with the user profile and metadata associated with the consumed content (e.g., characteristics of action, violence, comedy, etc.). At block 420, based upon the received data, profile content preferences are identified. The analysis may be performed by artificial intelligence or machine learning tools, for example.

At block 430, the multi-perspective content system transmits multi-perspective content to a device associated with the profile and configured to present a multi-perspective content perspective (e.g., a VR headset/suit/gloves). At block 440, the multi-perspective content system determines that the currently presented perspective by the device does not match to at least a predetermined amount with the user profile such as further described herein.

At block 450, the multi-perspective content system determines that a perspective of the multi-perspective content, different from the presented perspective, better matches with the user profile preference. At block 460, the multi-perspective content system causes a cue to be transmitted by the device designed to direct attention to the better-matching perspective.

At block 470, in response to the cue, the multi-perspective content system receives a command to switch to the better-matching perspective. At block 480, in response to the command, the multi-perspective content system causes the device to switch to the better-matching perspective.

Figure 5:
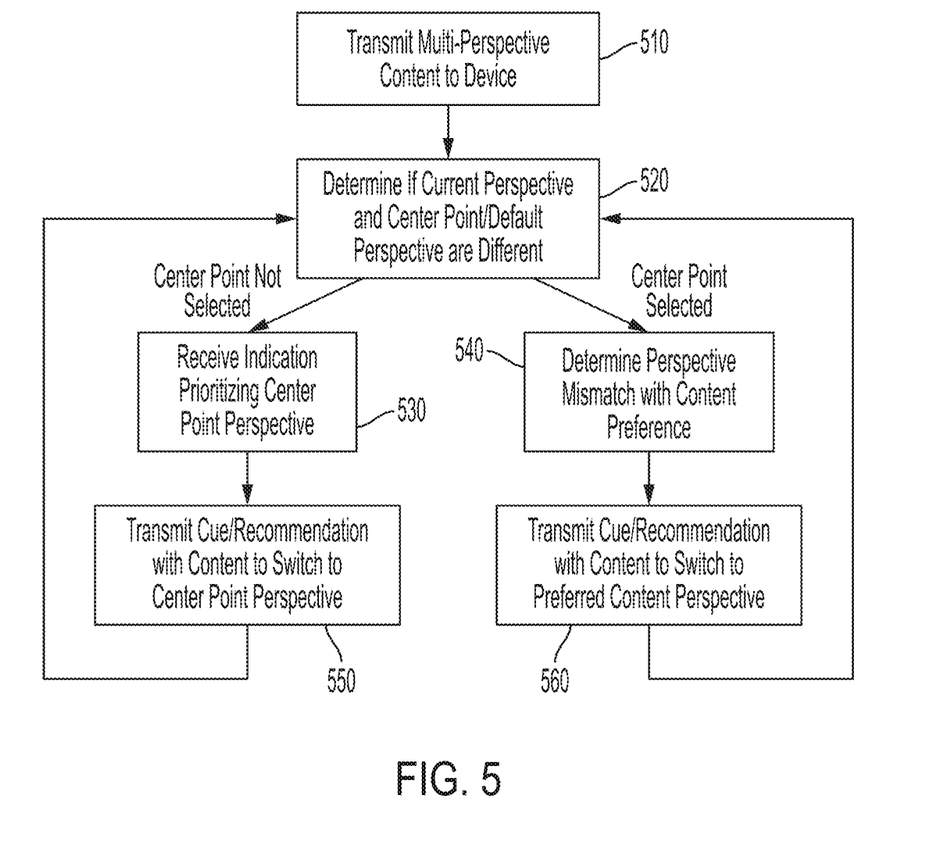
FIG. 5 shows an illustrative flowchart of a process for directing attention to center-point perspectives in a VR system, according to some embodiments of the disclosure.

FIG. 5 shows an illustrative flowchart of a process for directing attention to center-point perspectives in a multi-perspective content system according to some embodiments of the disclosure. At block 510, multi-perspective content is delivered to a multi-perspective device configured for presenting perspectives to a user. At block 520, the multi-perspective system determines whether a center-point perspective, or a perspective having higher-priority content than other perspectives, is currently presented by the device. At block 530, if a center-point perspective is not currently presented, the multi-perspective content system determines when a prioritized center-point perspective is currently being generated by the multi-perspective content system.

At block 550, when a prioritized center-point perspective is being generated, the multi-perspective content system transmits a cue to the multi-perspective device designed to direct attention to the prioritized center-point perspective. As described herein, the cue can be one or more of visual, audio, and/or haptic signals. The multi-perspective content system may then return to determining if the currently presented perspective is a center-point perspective at block 520.

At block 540, the multi-perspective content determines that the preference of a profile associated with the multi-perspective device does not sufficiently match characteristics of the currently presented perspective. Such as further described herein, the profile preference may be based on historical consumption data associated with the profile. When the profile preference and perspective do not correlate or match one another by at least a predetermined amount, and the perspective is not a prioritized center-point perspective, the multi-perspective system identifies an alternative perspective that better matches the profile preference as further described herein. The multi-perspective content system at block 560 then causes the multi-perspective device to transmit a cue designed to direct attention to the better matching perspective.

Figure 6:
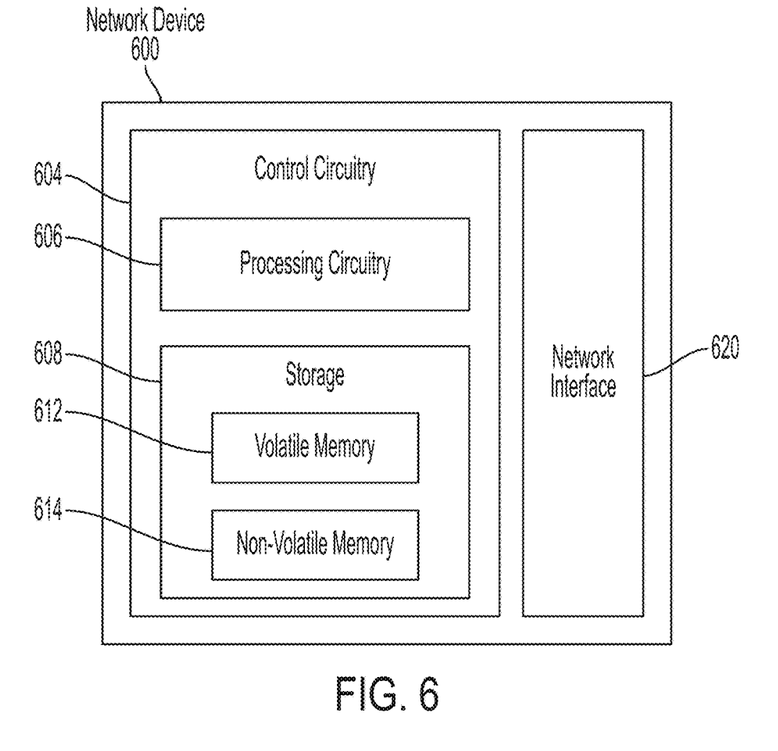
FIG. 6 shows an illustrative block diagram of a device in a multi-perspective content system, according to some embodiments of the disclosure.

FIG. 6 shows an illustrative block diagram of a device 600 in a multi-perspective content system, according to some embodiments of the disclosure. Device 600 in an AR/YR system may include one or more servers (e.g., servers 102 and 202 of FIGS. 1 and 2, respectively, and server 700 of FIG. 7) for generating, distributing, and/or managing multi-perspective content, including multiple perspectives, transmitted over a computer network to end-user multi-perspective devices (e.g., devices 100 and 200 of FIGS. 1 and 2, respectively, and end-user devices 720, 725, and 730 of FIG. 7). Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 606 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 620 may be used to communicate with other devices in a network system (e.g., between devices 700, 720, 725, and 730 across internet 710 of FIG. 7).

In some embodiments, control circuitry 604 executes instructions for execution of AR/YR content/perspective generation and/or processing functions stored in memory (i.e., storage 608). The instructions may be stored in either a non-volatile memory 614 and/or a volatile memory 612 and loaded into processing circuitry 606 at the time of execution. A system for generating and processing multi-perspective content (e.g., the systems described in reference to FIGS. 1-3 and 7) may be a stand-alone application implemented on a user device (e.g., end-user device 720, 725, or 730) and/or a server (e.g., device 700) or distributed across multiple devices in accordance with device 600. The system may be implemented as software or a set of executable instructions. The instructions for performing any of the embodiments discussed herein of AR/YR processing may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes described herein may be stored in storage 608, and executed by control circuitry 604 of device 600.

Figure 7:
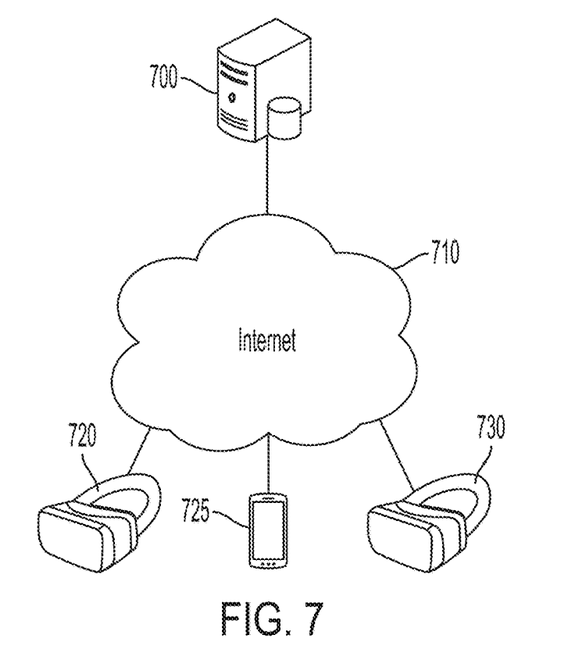
FIG. 7 shows an illustrative block diagram of a multi-perspective content system, according to some embodiments of the disclosure.

FIG. 7 shows an illustrative block diagram of a multi-perspective content system according to some embodiments of the disclosure. At least one multi-perspective content server 700 generates multi-perspective content, including multi-perspective content, such as further described herein. Multi-perspective content server 700 transmits the content over internet 710 to multiple end-user multi-perspective devices including devices 720, 725, and 730. End-user multi-perspective devices may include, for example, personal computers, mobile devices (e.g., smart phones), and/or wearable devices including AR/YR headsets, goggles, suits, gloves, etc., configured to present and operate multiple perspectives. These devices are configured to allow an operator/user to switch presentation between multiple perspectives of multi-user content. These devices may provide, for example, visual, audio, and haptic feedback that present the perspectives and attention-directing cues such as described herein.

Figure 8A:
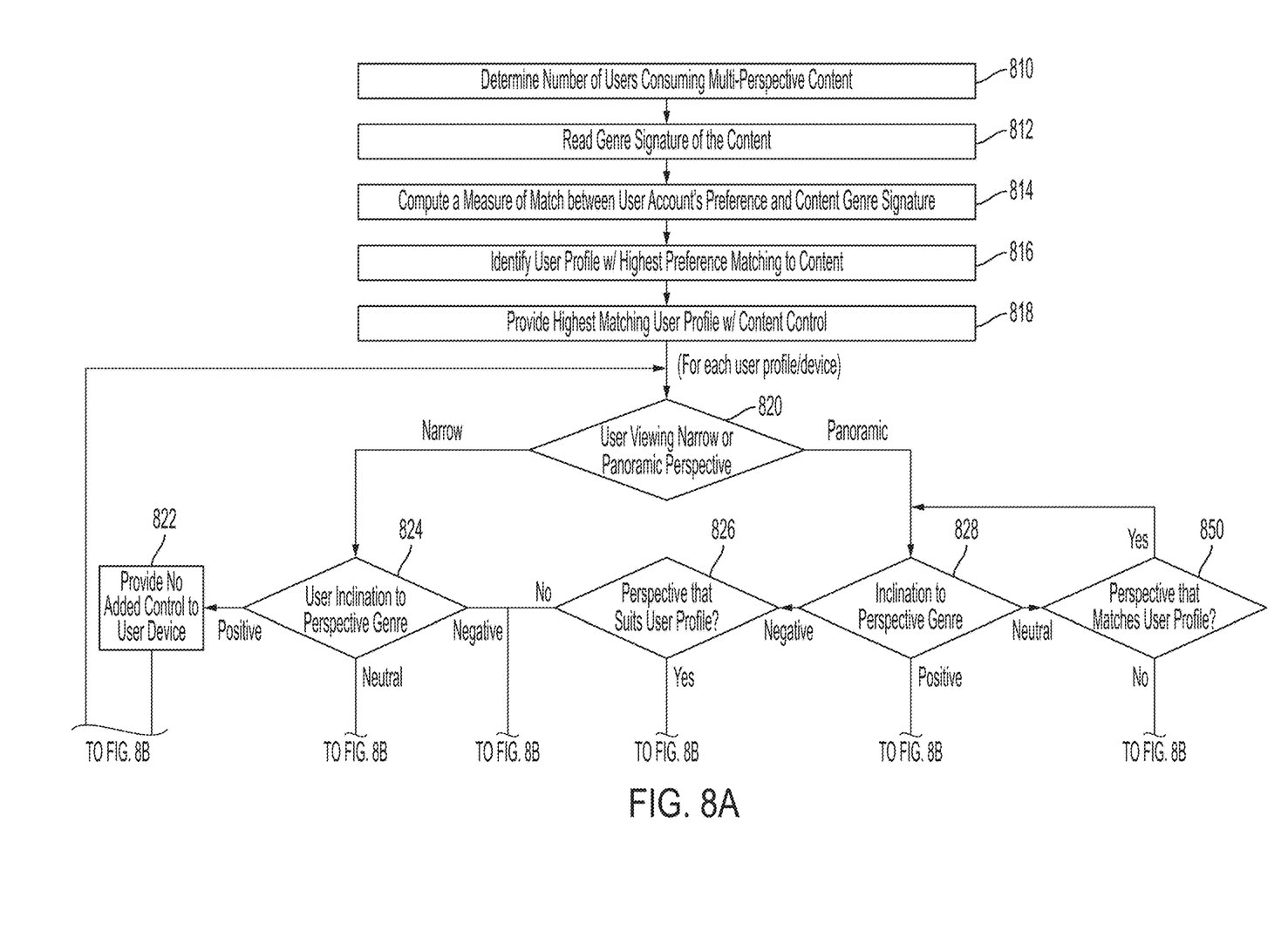
FIGS. 8A and 8B show an illustrative flowchart of a process for directing control and attention to perspectives in a multi-perspective content system, according to some embodiments of the disclosure.
Figure 8B:
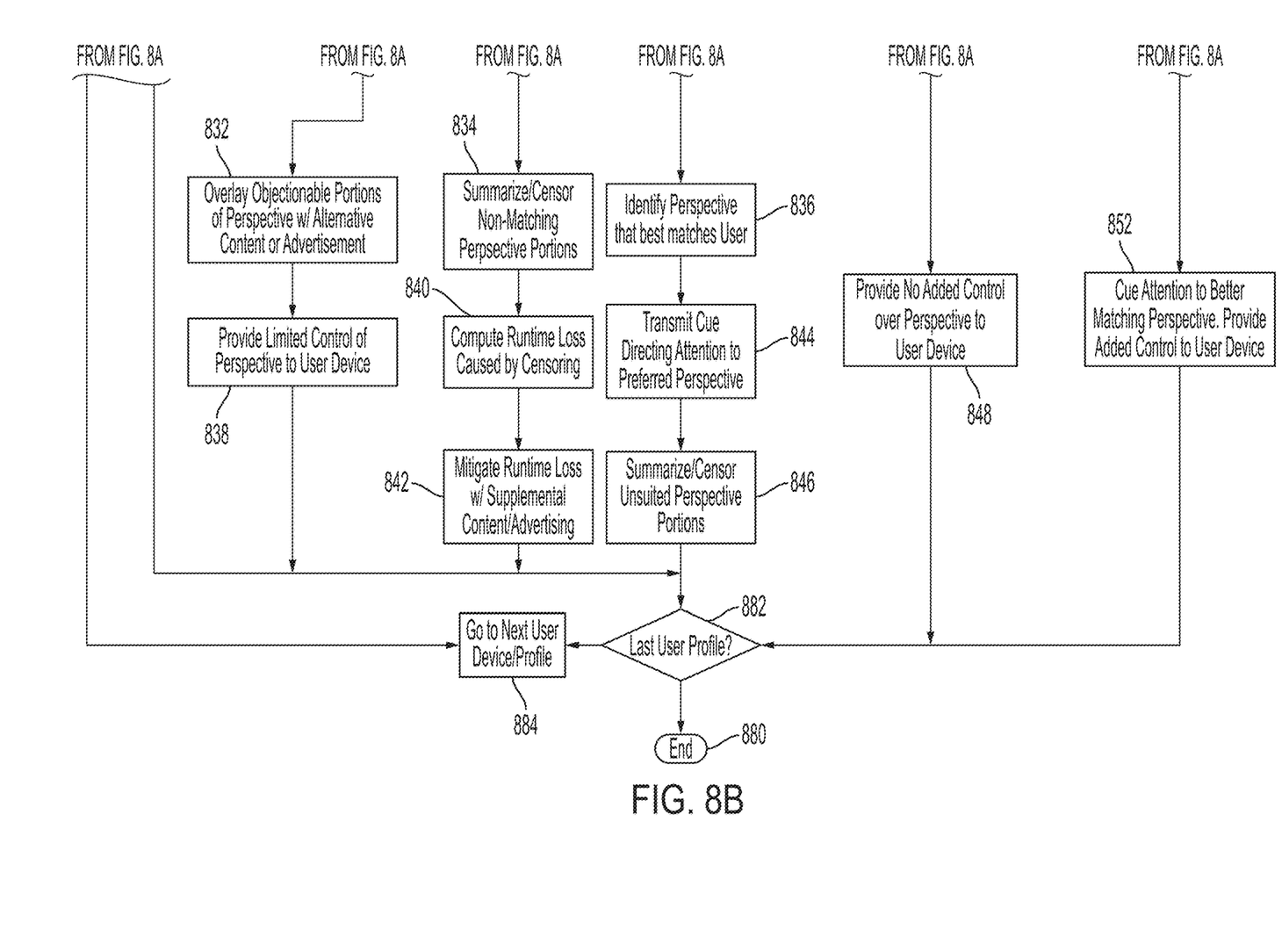

FIG. 8 shows an illustrative flowchart of a process for directing control and attention to perspectives in a multi-perspective content system according to some embodiments of the disclosure. In some embodiments, the process permits the manipulation or control of multi-perspective content/perspectives presented to different end-user devices based upon a profile preference associated with the respective end-user device. At block 810, the number of users consuming particular multi-perspective content is calculated. For example, the number of end-user setups of end-user devices (e.g., an associated set of multi-perspective goggles, suit, and gloves, etc.) concurrently connected into a particular multi-perspective realm is counted. An end-user setup may be associated with a particular user account and preference profile.

At block 812, the method further determines content characteristics (e.g., genre, levels of violence, romance, and comedy such as described herein) of the perspectives generated by the multi-perspective system for the respective multi-perspective realm. The profile preferences of each user account connected by respective devices to the multi-perspective realm are also determined such as described further herein. At block 814, a measure of match is determined between the profile preferences and multi-perspective content characteristics (e.g., preference/aversion to violence vs. determined characteristics of violence in content).

At block 816, the multi-perspective content system determines a user account with the highest level of match to the content. In some embodiments, at block 818, based upon the determination, the device set associated with the highest-matching user account is granted control over the multi-perspective content (e.g., controlling virtual movement/selection of perspectives within a VR realm).

For each respective end-user setup associated with a user account/profile, the multi-perspective content system determines at block 820 whether the setup is currently presented with a narrow or panoramic selection of multiple perspectives. If the perspective selection is narrow, the multi-perspective content system determines at 824 if the respective profile matches sufficiently with the current perspective (e.g., to at least a predetermined amount). If the profile and perspective match sufficiently, at block 822, no additional control is provided to the respective end-user setup.

If the profile and perspective do not match sufficiently, at block 834, the multi-perspective content system causes the perspective presentation to be modified so that presentation of negatively matched content is removed or reduced. For example, certain portions of the content may be provided via a censored/summary visual overlay rather than in the default graphic manner. In some cases, the modification may cause a delay of the complete presentation of important content to the respective end-user setup (e.g., elements of an important storyline of a VR realm).

The delay may cause a lag in presentation to that end-user setup compared to other end-user setups for which the content wasn't modified. At block 840, the multi-perspective content system calculates the lag, if any, between presentations. At block 842, in some embodiments, in order to mitigate the lag, supplemental content (e.g., advertising) is generated and presented to the other end-user setups while the lagging devices catch up to the same timeline.

At block 832, if a determined preference of a respective user profile is overall neutral relative to the currently presented perspectives, the multi-perspective content system may, in some embodiments, selectively filter portions of the presented perspective that do not match sufficiently with the user profile. This may include, for example, a limited visual overlay over a portion of visual content or a "bleeping"/substitution of non-critical audio content that does not match sufficiently with the profile. In some embodiments, at block 838, the respective user device setup is permitted partial control over the multi-perspective content/perspectives such as to allow attention to be directed to better-matching perspectives so as described herein.

At block 828, where a user device setup is presented with panoramic perspectives, the VR system determines whether the current perspective matches at least to a predetermined amount with the respective user profile (e.g., as described further herein). At block 826, if the current perspective does not match sufficiently with the user profile, the multi-perspective content system determines a perspective among the panoramic perspectives that matches better than the current perspective with the respective user profile. In some embodiments, the multi-perspective content system identifies the best-matching perspective at 836. At block 844, if the best-matching perspective is not the current perspective, the multi-perspective content system causes a cue to be generated and presented at the end-user setup to direct attention to a better-matching perspective. At block 846, the multi-perspective content system may also or alternatively filter portions of the current perspective to avoid presentation of portions that do not match sufficiently with the user profile.

At block 848, if the multi-perspective content system determines that the currently presented perspective matches sufficiently with the respective user profile, the multi-perspective content system does not provide additional control to the respective end-user setup for changing perspectives. At block 850, if the multi-perspective content system determines that matching between the currently presented perspective and the respective user profile is inconclusive/neutral, the multi-perspective content system determines whether another perspective better matches with the user profile. At block 852, based upon determining a better-matching perspective, the multi-perspective content system causes the generation and presentation of a cue at the end-user setup directing attention to the better-matching perspective.

At blocks 882 and 884, the multi-perspective content system cycles through another respective end-user setup/profile, beginning at block 820, until each end-user setup/profile is processed. The multi-perspective content system may continue repeating the process through each of the end-user setup/profiles until the multi-perspective content system terminates, at block 880, the particular realm in which the end-user setups are operating. Processing is repeated for other end-user setups/profiles at block 820.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A multi-perspective content delivery system, the multi-perspective content delivery system comprising one or more processors programmed with instructions to cause the one or more processors to perform:
   determining content characteristics of perspectives generated by the multi-perspective content delivery system for a multi-perspective realm;
   determining profile preferences of each user account connected by respective devices to the multi-perspective realm;
   determining a measure of match between the profile preferences and the content characteristics;
   determining a user account with a highest level of match; and
   granting control to the highest-matching user account over a multi-perspective content.

2. The multi-perspective content delivery system of claim 1, wherein the one or more processors are further programmed with instructions to cause the one or more processors to perform: calculating a number of users consuming the multi-perspective content, wherein the calculating the number of users comprises counting a number of end-user setups of end-user devices concurrently connected into the multi-perspective realm.

3. The multi-perspective content delivery system of claim 1, wherein the granting control over the multi-perspective content comprises granting the highest-matching user account control of virtual movement within the multi-perspective realm.

4. The multi-perspective content delivery system of claim 1, wherein the granting control over the multi-perspective content comprises granting the highest-matching user account control of selection of perspectives within the multi-perspective realm.

5. The multi-perspective content delivery system of claim 1, wherein the one or more processors are further programmed with instructions to cause the one or more processors to perform: determining whether a particular end-user setup associated with a particular user account of the user accounts connected by the respective devices to the multi-perspective realm is currently presented with a narrow or a panoramic selection of multiple perspectives.

6. The multi-perspective content delivery system of claim 5, wherein the one or more processors are further programmed with instructions to cause the one or more processors to perform:
responsive to a perspective selection being narrow, determining if a particular profile preference of the particular user account matches by at least a predetermined amount with content characteristics of a current perspective; and
responsive to the particular profile preference and the content characteristics of the current perspective not matching by at least the predetermined amount, modifying the perspective presentation so that presentation of negatively matched content is removed or reduced.

7. The multi-perspective content delivery system of claim 6, wherein the modifying the perspective presentation causes a delay that causes a lag in presentation to the respective end-user setup compared to other end-user setups with unmodified content, wherein the one or more processors are further programmed with instructions to cause the one or more processors to perform:
calculating the lag between presentations; and
generating and presenting supplemental content to devices of the other end-user setups while a device of the particular end-user setup catches up to a same timeline.

8. The multi-perspective content delivery system of claim 5, wherein the one or more processors are further programmed with instructions to cause the one or more processors to perform:
responsive to a perspective selection being panoramic, determining if a particular profile preference of the particular user account matches by at least a predetermined amount with content characteristics of a current perspective; and
responsive to the particular profile preference and the content characteristics of the current perspective matching by at least the predetermined amount, providing no control to the particular user account for changing perspectives.

9. The multi-perspective content delivery system of claim 5, wherein the one or more processors are further programmed with instructions to cause the one or more processors to perform:

responsive to a perspective selection being panoramic, determining if matching between a particular profile preference of the particular user account and the content characteristics of a current perspective is neutral;
responsive to determining that matching between the particular profile preference of the particular user account and the content characteristics of the current perspective is neutral, determining whether another perspective better matches with the particular profile preference; and
responsive to determining a better-matching perspective, causing a cue to be generated and presented at the particular end-user setup to direct attention the better-matching perspective.

10. The multi-perspective content delivery system of claim 5, wherein the one or more processors are further programmed with instructions to cause the one or more processors to perform:
responsive to a perspective selection being panoramic, determining if a particular profile preference of the particular user account matches by at least a predetermined amount with content characteristics of a current perspective; and
responsive to the particular profile preference and the content characteristics of the current perspective not matching by at least the predetermined amount, filter portions of the current perspective to avoid presentation of portions that do not match by at least the predetermined amount.

11. A method for guiding perspectives in a multi-perspective content delivery system, the method comprising:
determining content characteristics of perspectives generated by the multi-perspective content delivery system for a multi-perspective realm;
determining profile preferences of each user account connected by respective devices to the multi-perspective realm;
determining a measure of match between the profile preferences and the content characteristics;
determining a user account with a highest level of match; and
granting control to the highest-matching user account over a multi-perspective content.

12. The method of claim 11, further comprising calculating a number of users consuming the multi-perspective content, wherein the calculating the number of users comprises counting a number of end-user setups of end-user devices concurrently connected into the multi-perspective realm.

13. The method of claim 11, wherein the granting control over the multi-perspective content comprises granting the highest-matching user account control of virtual movement within the multi-perspective realm.

14. The method of claim 11, wherein the granting control over the multi-perspective content comprises granting the highest-matching user account control of selection of perspectives within the multi-perspective realm.

15. The method of claim 11, further comprising determining whether a particular end-user setup associated with a particular user account of the user accounts connected by the respective devices to the multi-perspective realm is currently presented with a narrow or a panoramic selection of multiple perspectives.

16. The method of claim 15, further comprising:
responsive to a perspective selection being narrow, determining if a particular profile preference of the particular user account matches by at least a predetermined amount with content characteristics of a current perspective; and responsive to the particular profile preference and the content characteristics of the current perspective not matching by at least the predetermined amount, modifying the perspective presentation so that presentation of negatively matched content is removed or reduced.

17. The method of claim 16, wherein the modifying the perspective presentation causes a delay that causes a lag in presentation to the particular end-user setup compared to other end-user setups with unmodified content, the method further comprising:

calculating the lag between presentations; and generating and presenting supplemental content to devices of the other end-user setups while a device of the particular end-user setup catches up to a same timeline.

18. The method of claim 15, further comprising:

responsive to a perspective selection being panoramic, determining if a particular profile preference of the particular user account matches by at least a predetermined amount with content characteristics of a current perspective; and responsive to the particular profile preference and the content characteristics of the current perspective matching by at least the predetermined amount, providing no control to the particular user account for changing perspectives.

19. The method of claim 15, further comprising:

responsive to a perspective selection being panoramic, determining if matching between a particular profile preference of the particular user account with content characteristics of a current perspective is neutral;

responsive to determining that matching between the particular profile preference of the particular user account and the content characteristics of the current perspective is neutral, determining whether another perspective better matches with the particular profile preference; and responsive to determining a better-matching perspective, causing a cue to be generated and presented at the particular end-user setup to direct attention the better-matching perspective.

20. The method of claim 15, further comprising:

responsive to a perspective selection being panoramic, determining if a particular profile preference of the particular user account matches by at least a predetermined amount with content characteristics of a current perspective; and responsive to the particular profile preference and the content characteristics of the current perspective not matching by at least the predetermined amount, filter portions of the current perspective to avoid presentation of portions that do not match by at least the predetermined amount.

\* \* \* \* \*